United States Patent [19]

DeFoster et al.

[11] Patent Number: 5,535,035

[45] Date of Patent: Jul. 9, 1996

[54] OPTICAL FIBER RING COMMUNICATIONS SYSTEM AND COMMUNICATIONS METHOD

[75] Inventors: Steven M. DeFoster, Rochester; Horst L. Truestedt, Pine Island; Raymond J. Thatcher, Rochester, all of Minn.

[73] Assignee: International Business Machines Corporation, Armonk, N.Y.

[21] Appl. No.: 306,560

[22] Filed: Sep. 15, 1994

[51] Int. Cl.$^6$ .......................... H04B 10/08; H04B 10/12; H04B 10/20

[52] U.S. Cl. ......................... 359/161; 359/110; 359/177; 370/16.1

[58] Field of Search ................................ 370/14, 15, 16, 370/16.1; 359/110, 161, 177

[56] References Cited

U.S. PATENT DOCUMENTS

| | | | |
|---|---|---|---|
| 4,688,266 | 8/1987 | Ochiai | 359/166 |
| 4,973,953 | 11/1990 | Shimokawa | 359/177 |
| 4,994,675 | 2/1991 | Levin et al. | 359/110 |
| 5,105,188 | 4/1992 | Jung | 370/16.1 |
| 5,136,410 | 8/1992 | Heiling et al. | 359/110 |
| 5,136,589 | 8/1992 | Konishi | 370/16.1 |
| 5,146,357 | 8/1992 | Epstein | 359/110 |
| 5,299,312 | 3/1994 | Rocco | 370/16.1 |
| 5,327,427 | 7/1994 | Sandersara | 370/16.1 |

FOREIGN PATENT DOCUMENTS

| | | | |
|---|---|---|---|
| 0061237 | 4/1984 | Japan | 359/110 |
| 0224738 | 10/1986 | Japan | 359/177 |
| 0036625 | 2/1990 | Japan | 359/110 |

*Primary Examiner*—Leslie Pascal
*Attorney, Agent, or Firm*—Joan Pennington

[57] ABSTRACT

A communications method and an optical fiber ring communications system including multiple devices or ports are provided. The optical fiber ring communications system includes first and second optical link modules (OLMs) coupled to each of the multiple ports. First and second optical fibers extend between adjacent ports in the ring communications system and are coupled at each end to one of the first and second OLMs. The first and second optical fibers define dual fiber channel arbitrated loops during normal operation in the system. If an optical fiber link is disconnected between two ports, then the communications system is configured as a single arbitrated loop. Alternatively, when the communications system includes a ruler port and subject ports, then the communications system can be configured as two separate loops coupled by the ruler port if an optical fiber link is disconnected between two ports. The ring communications system supports a large number of ports and the circumference of the ring can equal hundreds of kilometers.

10 Claims, 5 Drawing Sheets

FIG. 5

PORT

REPEATS THE DATA IT RECEIVES AND SENDS IT TO THE NEXT DEVICE FOR BOTH LOOPS
←——————————
——————————→

SENDS AN ARB SIGNAL OUT ON BOTH LOOPS
——————————→

RECEIVES ITS OWN ARB BACK ON LOOP 1
←——————————

BREAKS THE LOOP AND SENDS AN OPN TO A DEVICE (PORT 3)
——————————→

SEND DATA NEEDED TO DEVICE
——————————→

PERIODICALLY RECEIVES ACKNOWLEDGE SIGNAL FROM DEVICE (PORT 3)
←——————————

IF AN ACKNOWLEDGE IS NOT RECEIVED, DEVICE WILL REESTABLISH THE LINK WITH DEVICE (PORT 3) AND RESEND DATA SENT AFTER THE LAST SUCCESSFUL ACKNOWLEDGE
——————————→

WHEN THE DATA TRANSFER IS COMPLETED, ONE OF THE DEVICES SENDS A CLS SIGNAL AND THE LOOP IS RELINQUISHED
——————————→

START REPEATING DATA ON BOTH LOOPS AGAIN
←——————————
——————————→

LINK_DISABLED SIGNAL RECEIVED FROM OLM
←——————————

SWITCHES TO SINGLE LOOP CONFIGURATION AND SENDS A LOOP INITIALIZE PARAMETERS (LIP) MESSAGE
——————————→

OPTICAL FIBER RING COMMUNICATIONS SYSTEM AND COMMUNICATIONS METHOD

BACKGROUND OF THE INVENTION

1. Field of the Invention

The invention relates generally to a multiple node ring communications system, and more particularly to an optical fiber multiple node ring communications system including a dual optical fiber between nodes and a communications method for an optical fiber ring communications system.

2. Description of the Prior Art

Fiber optic communications systems have the potential for providing large system bandwidth and high information carrying capacity. Increased capacity would be very desirable for many types of communications systems. A significant example is data communications where a need exists for rapidly and reliably transmitting large volumes of digital information.

Many types of laser-based devices and systems, having a wide range of applications, such as in medical technology, in communications and computing technology, are becoming increasingly well known and commercially available.

The lasers used in many of these devices and systems are often capable of producing powerful outputs that are potentially harmful to both people and equipment. As a result, many types of safety devices for use in conjunction with laser-based equipment, and standards designed to ensure that laser-based equipment may be safely operated, have been developed and continue to evolve.

For example, U.S. Pat. No. 5,136,410 to Heiling et al. describes an optical fiber link control safety system that operates, in a self-contained fashion, as part of an optical fiber link card or optical link module (OLM). The disclosed optical fiber control (OFC) circuitry reduces or shuts off a laser's radiant energy output when a link failure is detected and periodically checks to determine if the failure is corrected and restores full continuous power to the laser when determined that the line is operationally safe.

ANSI standards require an OFC circuit for all shortwave laser communications devices. Typically shortwave lasers are used in fiber channel devices. Shortwave lasers can be used in asynchronous transfer mode (ATM) protocol communications cards, so the OFC circuit can also be used in ATM protocol communications cards. There is also the potential for shortwave lasers to be used in fiber-distributed data interface (FDDI) protocol communications cards, thus again requiring use of the OFC circuit for safety purposes. Also, the OFC circuit can be adapted for use in longwave laser communications cards to provide a less expensive alternative than the dual shutter method typically used for safety in longwave laser applications.

In conventional single optical fiber ring communications systems, typically only five or six nodes can be put in the ring and the total ring circumference must be less that two kilometers. This five or six computer, two kilometer limitation is due to the characteristics of the OFC circuit. The known optical fiber ring communications systems include multiple nodes with each node having a transmitter and a receiver connected to a respective one of two optical fibers connected to the node and a single optical fiber between adjacent nodes. A single closed path or unidirectional communications ring or loop is provided. Upon power-up and periodically during operation, the optical fiber control (OFC) circuitry used to detect when a link failure has occurred and to periodically check to determine if the failure has been corrected, requires a test signal to propagate once around the ring. This test signal is referred to as a loop-is-closed signal. The OFC circuitry of one of the nodes sends a loop-is-closed signal from its transmitter and waits for the signal to be relayed through each node around the ring back to its receiver. If the loop-is-closed signal does not return to its receiver within a predetermined time period, the OFC circuitry determines that a link failure has occurred and shuts the laser off to avoid a potential safety hazard. As the distance and the number of OFC cards increases, the loop-is-closed signal takes longer and longer to go around the ring. When the number of nodes increases so that the loop-is-closed signal is unable to complete the loop within the predetermined time period, the OFC will not allow any of the cards to power up their lasers for normal communications. Another significant disadvantage of conventional single optical fiber ring communications systems is that the entire loop goes down when one fiber becomes inoperative.

A need exists for a communications method and optical fiber apparatus that avoids the inherent limitations resulting from an OFC circuit (five or six computers and two kilometer ring limitations) of the prior art systems and that provides improved performance and is simple to implement.

SUMMARY OF THE INVENTION

A principal object of the present invention is to provide an improved communications method and an optical fiber ring communications system including multiple devices with a pair of optical fibers connected between adjacent devices and a pair of optical link modules connected to a single port of each device. Other objects are to provide such method and apparatus substantially without negative effects, and that overcome disadvantages of prior art arrangements.

In brief, the objects and advantages of the present invention are achieved by a communications method and an optical fiber ring communications system including multiple devices or ports. The optical fiber ring communications system includes first and second optical link modules (OLMs) coupled to each of the multiple ports. First and second optical fibers extend between adjacent ports in the ring communications system and are coupled at each end to one of the first and second OLMs. The first and second optical fibers define dual fiber channel arbitrated loops during normal operation in the system. If an optical fiber link is open or is disconnected between two ports, then the communications system is configured as a single arbitrated loop. Alternatively, when the communications system includes a ruler port and subject ports, the communications system can be configured as two smaller separate loops coupled by the ruler port when an optical fiber link is disconnected between two ports.

BRIEF DESCRIPTION OF THE DRAWING

The present invention together with the above and other objects and advantages may best be understood from the following detailed description of the embodiment of the invention illustrated in the drawings, wherein:

FIG. 5 is a sequence chart illustrating exemplary sequential protocol communications of the fiber optic ring communications system of the invention.

DETAILED DESCRIPTION OF THE PREFERRED EMBODIMENT

Figure 1:
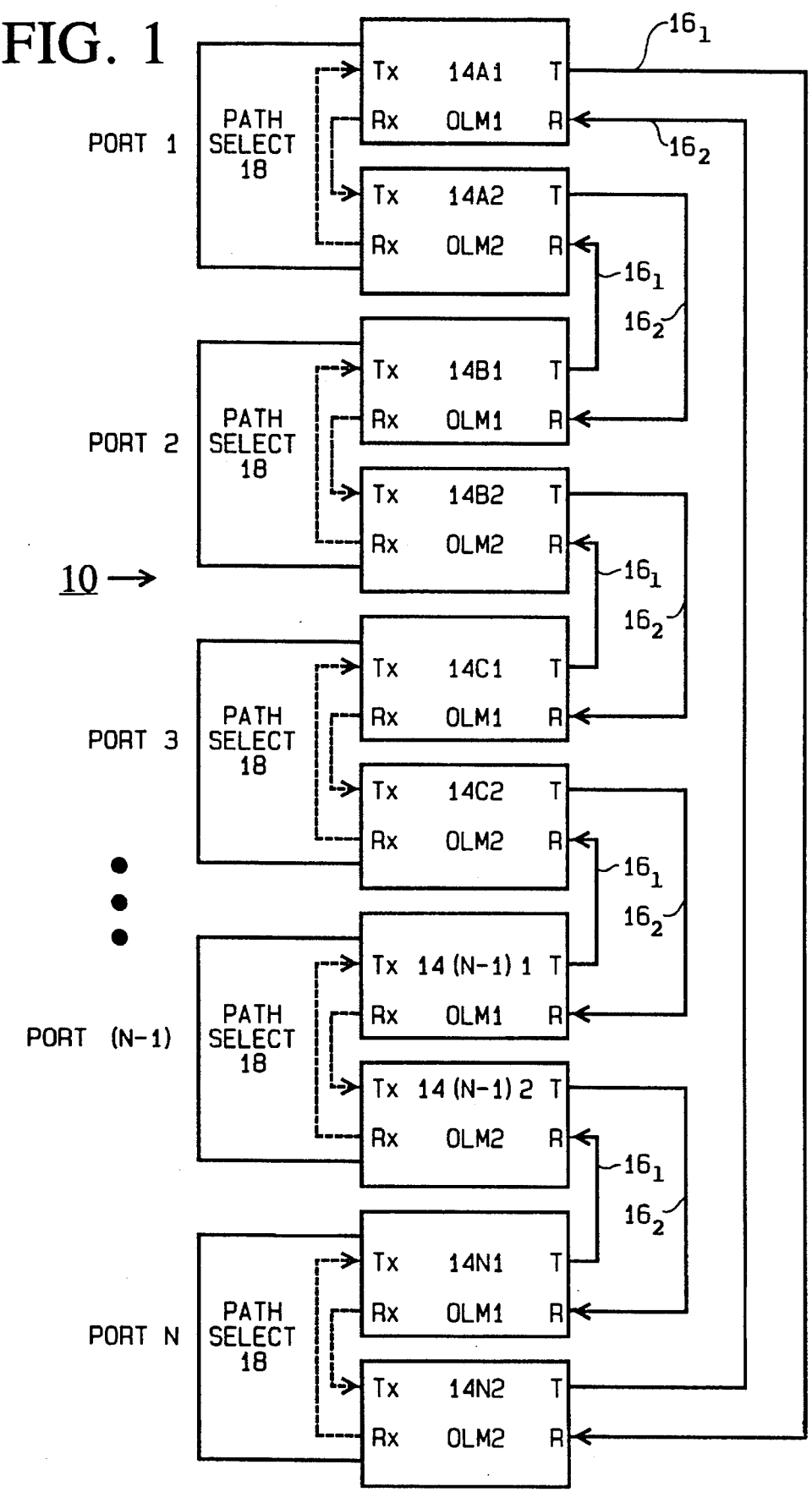
FIG. 1 is a block diagram representation of a fiber optic ring communications system embodying the invention.

In FIG. 1, there is shown a block diagram of an optical fiber ring communications system generally designated by the reference character 10. System 10 connects multiple intelligent electronic devices, such as disk drives and computers, corresponding to ports 1, 2, 3, (N–1) and N, as shown. Each port 1, 2, 3, (N–1) and N uses a pair of shortwave laser communications cards or optical link modules (OLMs) 14A1, 14A2, 14B1, 14B2, 14C1, 14C2, 14(N–1)1, 14(N–1)2, 14N1 and 14N2 with a pair of optical fibers $16_1$ and $16_2$ between each adjacent port. Each port 1, 2, 3, (N–1) and N includes a port path select block 18 for selectively providing predetermined intraport paths as illustrated and described below with respect to FIGS. 1–3. A link between adjacent ports is described by the dual optical fibers $16_1$ and $16_2$.

System 10 allows the number of nodes in the ring to be greatly increased as compared to a conventional single optical fiber ring communications system. In system 10, a large number of computers can be hooked together in a ring of unlimited circumference, as long as each port is within the transmission distance that the OLM 14 is capable of transmitting a signal, typically 1–2 kilometers for a shortwave laser. Each of the ports 1-N includes a conventional (FC-PH) protocol chip with the dual OLMs providing two independent transmitters and receivers for dual fiber channel arbitrated loops (FCALs) corresponding to the dual optical fibers $16_1$ and $16_2$ as shown in FIG. 1. Instead of one port sending a loop-is-closed signal and waiting for the signal to be relayed around the entire loop as required by the conventional single optical fiber ring communications systems, in system 10 of the invention each OLM 1 and OLM 2 for every port 1-N sends a closed-link test signal from its transmitter to the receiver of its adjacent port and waits for the adjacent port to send the signal back. For example, as shown in FIG. 1, the 14A1 transmitter sends a closed-link test signal to the 14N2 receiver and the 14N2 transmitter sends the closed-link test signal back to the 14A1 receiver. Likewise, the 14A2 transmitter sends a closed-link test signal to the 14B1 receiver and the 14B1 transmitter sends the closed-link test signal back to the 14A2 receiver. Similarly, the 14B2 transmitter sends a closed-link test signal to the 14C1 receiver and the 14C1 transmitter sends the closed-link test signal back to the 14B2 receiver. Likewise, the 14C2 transmitter sends a closed-link test signal to the 14(N–1)1 receiver and the 14(N–1)1 transmitter sends the closed-link test signal back to the 14C2 receiver. Similarly, the 14(N–1)2 transmitter sends a closed-link test signal to the 14N1 receiver and the 14N1 transmitter sends the closed-link test signal back to the 14(N–1)2 receiver.

Figure 2:
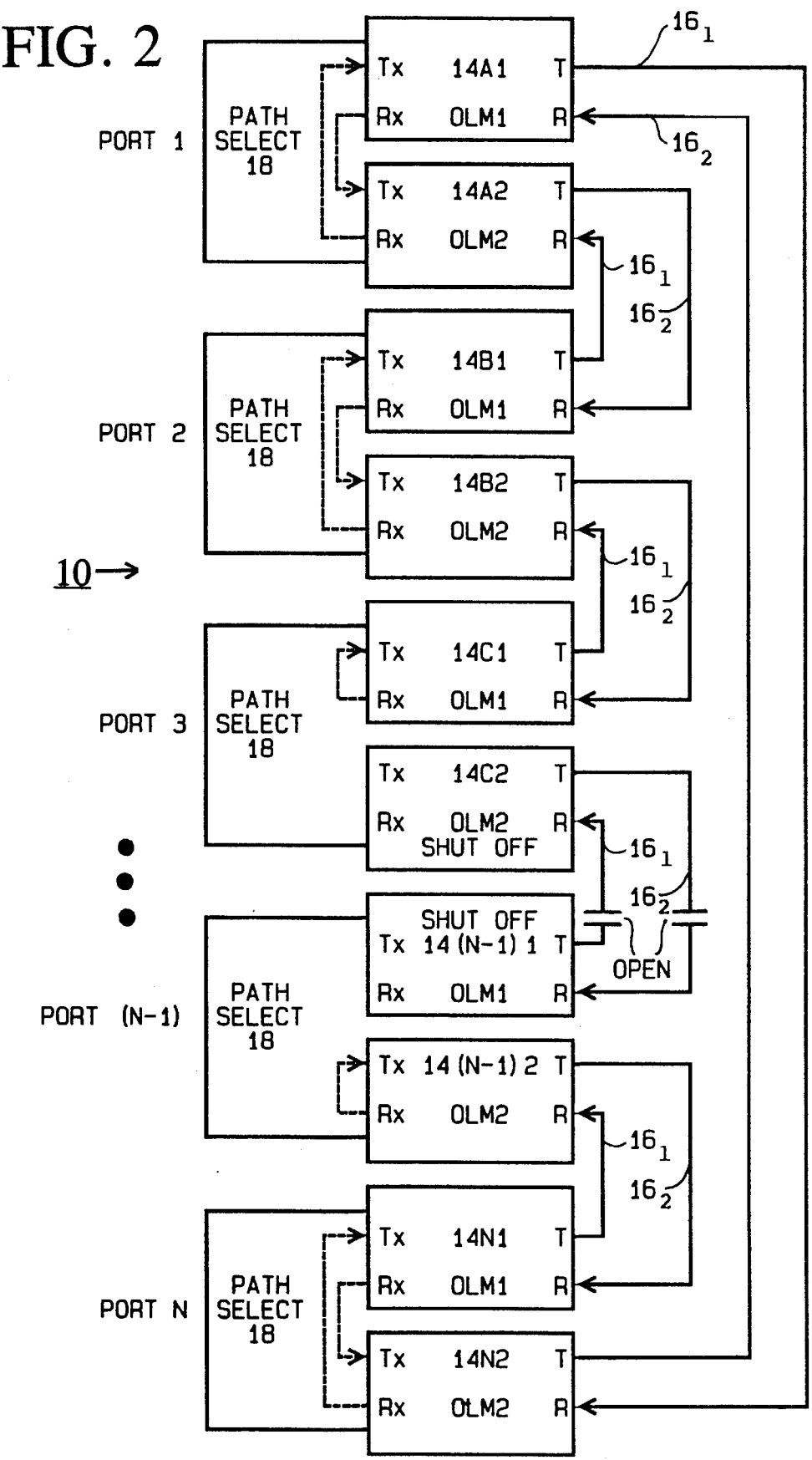
FIG. 2 is a block diagram illustrating the operation of the fiber optic loop communications system of FIG. 1 with a broken fiber optic link between ports 3 and (N–1)
Figure 3:
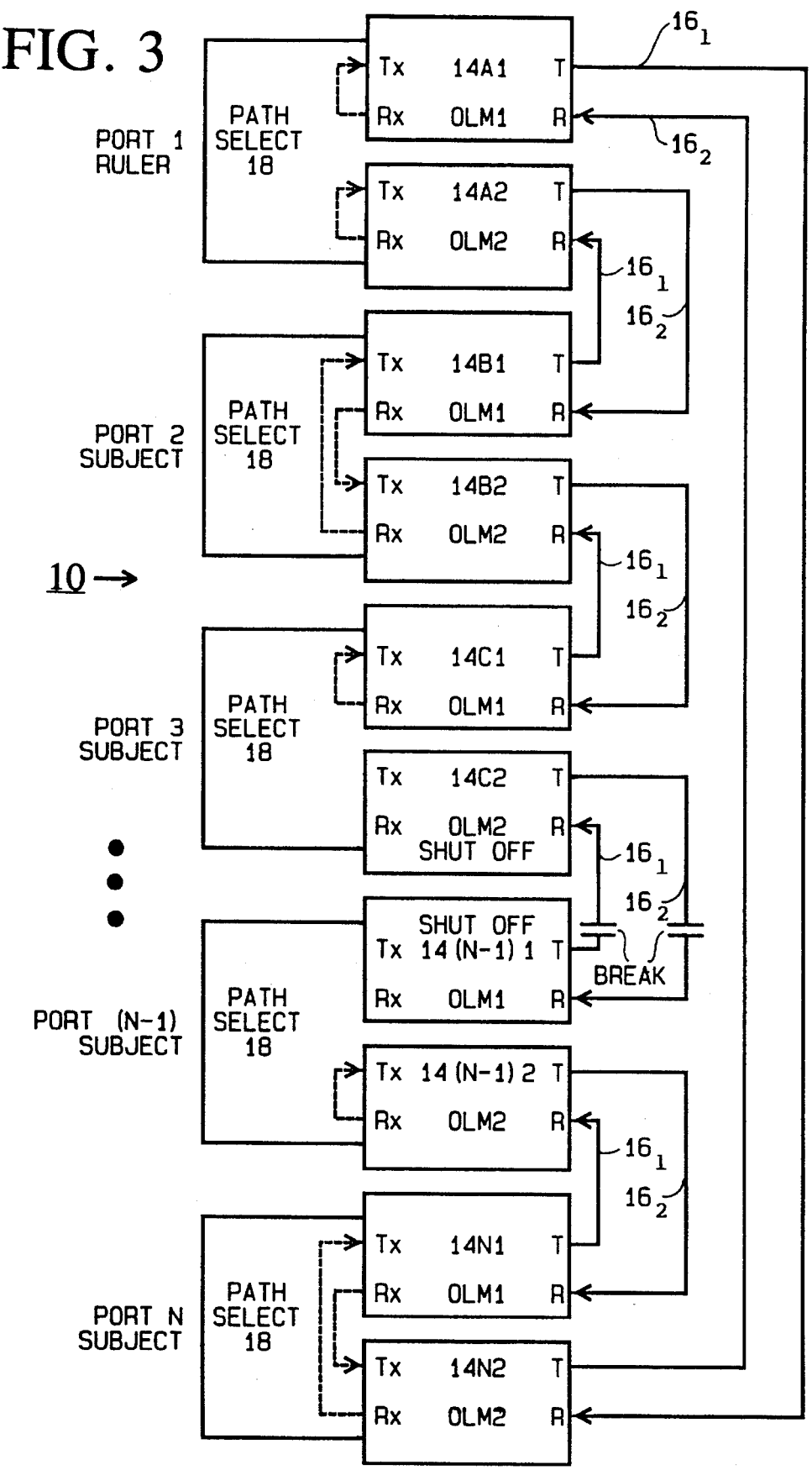
FIG. 3 is a block diagram illustrating an alternative operation of the fiber optic loop communications system of FIG. 1 arranged with a ruler port 1 and subject ports 2, 3, (N–1) and N and with a broken fiber optic link between ports 3 and (N–1)
Figure 4:
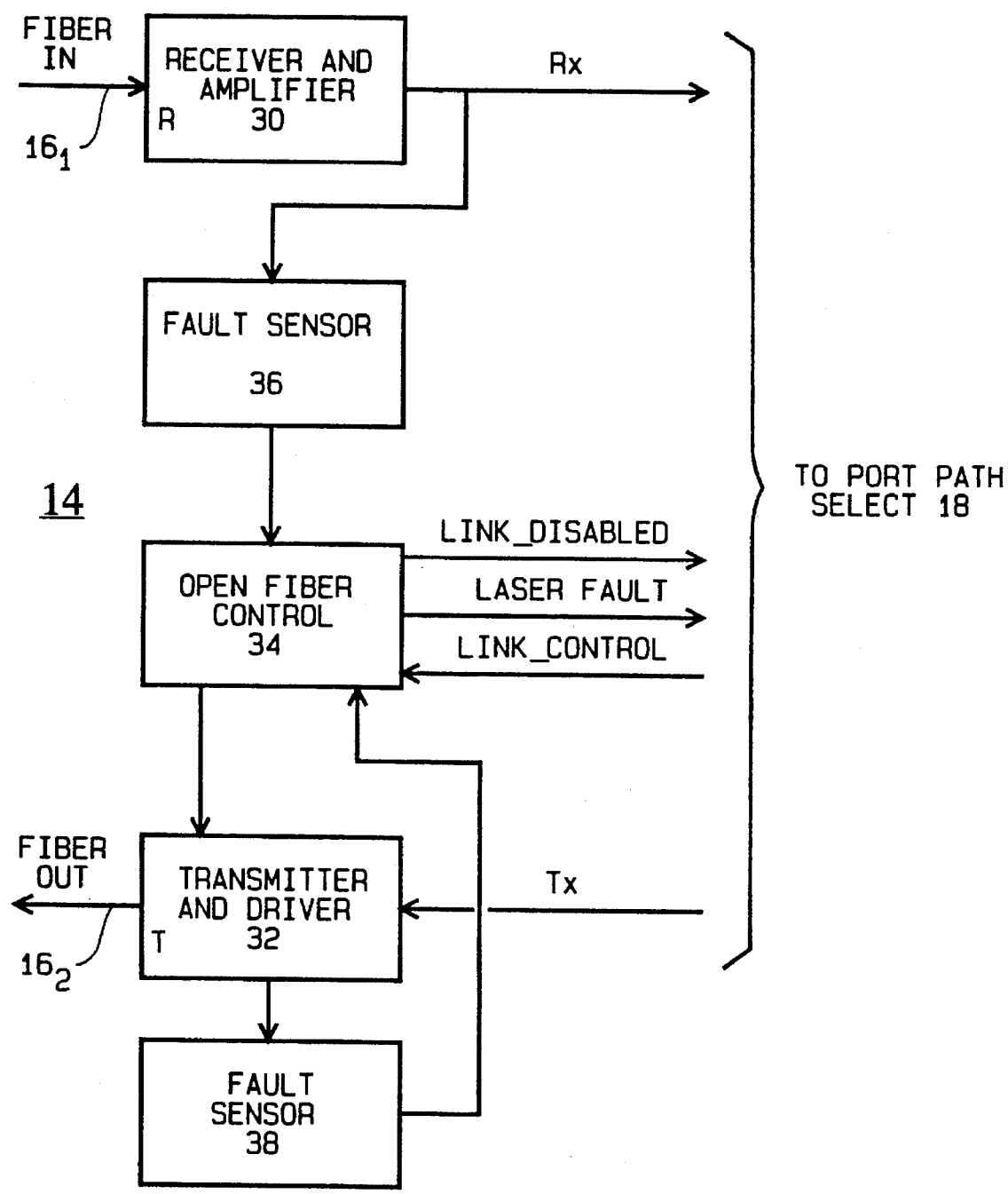
FIG. 4 is a block diagram illustrating an optical link module (OLM) of the fiber optic loop communications system of FIG. 1.

System 10 also has the advantage that a single fault can be tolerated, for example, such as, a single broken fiber link between two of the OLMs that are illustrated and more completely described with respect to FIG. 4. Unlike the conventional single-fiber ring where the entire loop goes down if one fiber becomes inoperative, system 10 can operate as a single arbitrated loop as illustrated in FIG. 2, or system 10 operates as two smaller loops coupled by the ruler port 1 as illustrated in FIG. 3, instead of the normal configuration for dual arbitrated loops shown in FIG. 1. The present invention allows a pair of very cost effective OLMs 1 and 2 to be used with each of a large number of ports, providing a more robust system with higher performance while still maintaining the optical fiber control (OFC) function of the OLM.

Various commercially available devices can be used to implement the OLMs 14A1, 14A2, 14B1, 14B2, 14C1, 14C2, 14(N–1)1, 14(N–1)2, 14N1, 14N2, for example, such as, a device IBM 531 Mb/s Optical Link Module (OLM-531) manufactured and sold by International Business Machines, of Armonk, N.Y.

FIG. 1 shows five devices or ports, port 1, port 2, port 3, port (N–1) and port N connected in a ring using ten OLMs 14A1, 14A2, 14B1, 14B2, 14C1, 14C2, 14(N–1)1, 14(N–1)2, 14N1 and 14N2; however, it should be understood that any number of devices or ports can be included in the fiber optic ring communications system 10. Five ports, port 1, port 2, port 3, port (N–1) and port N are shown to simplify the example. Each port, port 1, port 2, port 3, port (N–1) and port N, can transmit its own data on the fiber optic ring, and each port repeats the data received, for example from OLM 14A1 to OLM 14A2 and from OLM 14A2 to OLM 14A1. Data normally can be sent over the two optical fibers $16_1$ and $16_2$ in two directions between the devices port 1, port 2, port 3, port (N–1) and port N. Each of the optical fibers $16_1$ and $16_2$ of the link is on a different loop as shown in FIG. 1 so that there are two separately operating fiber channel arbitrated loops during normal operation. Two loops provide more performance; since when one loop is busy, the other loop may be used or the two loops may be used simultaneously to provide two times the bandwidth of a single loop. For example, ports 1 and 3 can communicate over one loop corresponding to optical fibers $16_1$, while ports 2 and N communicate over the other loop corresponding to optical fibers $16_2$. Also, in system 10 the two loops provide redundancy if one should break.

In FIG. 1, the intraport signal paths are indicated in dotted line at port 1, port 2, port 3, port (N–1) and port N that are selectively provided by the path select 18 for two independent loops in the normal configuration of system 10. When any port desires to communicate on a loop, it will request to get control or arbitrate for both loops, and will communicate on whichever loop it gets control of first. This particular port 1, port 2, port 3, port (N–1) or port N will not use the second loop and will be a repeater for the unused loop. In FIGS. 2 and 3, alternative configurations of the system 10 are shown with a break in the optical fibers $16_1$ and $16_2$ between ports 3 and (N–1). In FIG. 2, the intraport signal paths are similarly indicated in dotted line at port 1, port 2, port 3, port (N–1) and port N that are selectively provided by the path select 18 for a single loop configuration of the system 10. In FIG. 3, the intraport signal paths are similarly indicated in dotted line at port 1, port 2, port 3, port (N–1) and port N that are selectively provided by the path select 18 with a ruler port 1 and subject ports 2, 3, (N–1) and N.

Advantages of system 10 are enabled by the two fiber channel cards OLM 1 and OLM 2 used with one port or single address. System 10 can tolerate a break in the dual optical fibers $16_1$ and $16_2$ between OLMs of adjacent ports. As shown in FIG. 2, with a break in the optical fibers $16_1$ and $16_2$ between ports 3 and (N–1), the system 10 then operates as a single loop with the intraport paths reconfigured by the path select blocks 18. Performance is degraded since system 10 goes from two loops corresponding respectively to optical fibers $16_1$ and $16_2$ in FIG. 1 where four devices, such as ports 1, 2, 3 and N, can be using concurrently to one loop defined by both optical fibers $16_1$ and $16_2$ in FIG. 2 where only two devices, such as ports 1 and 2, can communicate on concurrently. As shown in FIG. 3, with a break in the optical fibers $16_1$ and $16_2$ between ports 3 and (N–1), the system 10 then operates as two separate smaller loops coupled by the ruler port 1. Where port 1 is the ruler port and ports 2, 3, (N–1) and N are subject ports, the system reconfiguration as shown in FIG. 3 can provide improvement over the single loop configuration of FIG. 2. In FIG. 3, much of the data stays in one loop including ruler port 1 and subject ports 2 and 3 and much of the data stays in the other loop including ruler port 1 and subject ports N and (N–1). When data is sent from a subject port in one loop to a subject port in the other loop, for example from subject port 3 to subject port N, the ruler port 1 can supply the gateway between these two loops. Then the path select 18 for port 1 selectively provides the intraport paths as shown in FIGS. 1 and 2.

FIG. 4 provides a functional block diagram of an OLM 14. Each of the OLMs 14A1, 14A2, 14B1, 14B2, 14C1, 14C2, 14(N–1)1, 14(N–1)2, 14N1 and 14N2 includes a receiver and amplifier block 30 having an input labelled R that receives an incoming, modulated optical signal from the associated optical fiber $16_1$ or $16_2$ and applies the received data at a line labelled Rx to an optical link interface of the port path select 18. Transmit data from the port path select 18 indicated at a line labelled Tx is applied to a transmitter and driver block 32 of the OLM 14 that modulates a laser (not shown) with the transmit data at an output labelled T and provides the outgoing, modulated optical signal to the associated optical fiber $16_1$ or $16_2$. In FIGS. 1–3, corresponding optical fiber transmit outputs T, receiver inputs R and data port path receive data inputs Rx and transmit data outputs Tx are shown with each of the OLMs 14A1, 14A2, 14B1, 14B2, 14C1, 14C2, 14(N–1)1, 14(N–1)2, 14N1 and 14N2. An open fiber control (OFC) block 34 provides safety laser controls. A fault sensor 36 detects a minimum AC level of modulated light entering a photo-detector (not shown) in the receiver and amplifier block 30 and applies a fault signal to the OFC 34 if the fiber becomes disconnected, for example, if the fiber is cut or a connector is separated. A fault sensor 38 detects improper operation of the laser of the transmitter and driver block 32 and applies a fault signal to the OFC 34 if a laser drive failure is detected. If the associated optical fiber link is broken, the OFC 34 reduces or shuts down the laser and then uses timed pulses to ascertain when the link is reestablished. OFC 34 provides control signals to associated port path select block 18 as indicated at lines labelled LINK_DISABLED, LASER FAULT and LINK_CONTROL. For example, the LINK_DISABLED control signal indicates that an optical fiber $16_1$ or $16_2$ is out and then a single communication loop for the system 10 can be used as shown in FIG. 2 or alternatively, two separate loops can be used for the system 10 as shown in FIG. 3. A closed loop for the closed-link test between any two ports is provided by the dual optical fibers $16_1$ and $16_2$. Laser safety standards are met and a large number N devices can be connected to system 10; for example, each of the adjacent OLMs 14A2 and 14B1 powers up its laser at each end of the closed loop and exchange link test request and acknowledge signals or handshake.

Ports 1, 2, 3, (N–1) and N conform to fiber-channel, ATM or other communications protocols. Four primitives are sent by the ports 1, 2, 3, (N–1) and N around a given loop when using fiber-channel protocol. An arbitration (ARB) signal is sent when a given port wants to use the loop. An open (OPN) signal is sent when a given port has the loop and is requesting to open a connection with another port. A close (CLS) signal is sent when a given port is done sending data on the loop and is disconnecting from the loop, making it available again. A loop initialize parameters (LIP) signal is sent out by a port when it first hooks into a loop. Another important signal, but not a primitive, is an acknowledge (ACK) signal sent periodically to acknowledge that data has been received.

Having reference to FIGS. 1 and 5, during normal operation of system 10, each of the ports 1, 2, 3, (N–1) and N has access to two optical fiber arbitrated loops $16_1$ and $16_2$ with the port path select block 18 connected to the two OLMs 14A1, 14A2; 14B1, 14B2; 14C1, 14C2; 14(N–1)1, 14(N–1)2; and 14N1, 14N2, respectively. When any port is not sending information on a loop, the port's OLM 1 and/or OLM 2 simply repeats the data it receives and sends it to the next port. When port 1 wants to send a message to port 3, it sends an ARB signal out on both loops 1 and 2. If it gets its own ARB back on loop 1, it knows the loop 1 is available and breaks or takes control of loop 1. Port 1 then sends an OPN to port 3. Then port 1 opens loop 1 at its end if port 3 is available. If port 3 is busy or not in the loop, port 1 will get its OPN signal back. Port 1 will then know to try again later. If port 3 is available to communicate with port 1, the two ports will send all of the data needed to each other. Periodically, for example after a predefined number of frames, port 3 will acknowledge to port 1 that the data was received. If the data is lost and an acknowledge is not received, port 1 will try to reestablish the link with port 3 and send all of the data again that was sent after the last successful acknowledge. When the data transfer is completed, one of the ports 1 or 3 sends a close (CLS) signal, and the ports 1 and 3 relinquish the loop and start repeating data again.

Having reference to FIGS. 2 and 5, if one of the fibers in the ring opens up, for example as shown between ports 3 and (N–1), then the OFC 34 in OLM 14C2 and OLM 14(N–1)1 provides a LINK_DISABLED signal to ports 3 and (N–1). Then system 10 switches to a single loop configuration for the system 10. Both devices at ports 3 and (N–1) send a loop initialize parameters (LIP) message through the ring network telling all other devices at ports 1, 2 and N that the double ring was broken in this one place. As shown in FIG. 2, all of the ports 1, 2, 3, (N–1) and N switch over to using a single loop. In this single loop mode, system 10 loses its redundancy and some performance, but remains operational for less cost than would be required for two completely separate ports. When a loop is broken in the middle of a transmission, the sending device will not get an acknowledge from the designated receiving device so that and the lost data will be retransmitted. When the broken link is repaired, the OLM automatically senses that the link is closed and system 10 is restored to the dual loop configuration as shown in FIG. 1. Any data that is lost when the network switches from a single to double loop or vice versa is resent automatically.

Having reference to FIGS. 3 and 4 with the ruler and subject ports, if one of the fibers in the ring opens up, for example as shown between ports 3 and (N–1), then the OFC 34 in OLM 14C2 and OLM 14(N–1)1 provides a LINK_DISABLED signal to ports 3 and (N–1) and system 10 switches to the two smaller loops configuration for the system 10. Both devices at ports 3 and (N–1) send a loop initialize parameters (LIP) message through the ring network telling all other devices at ports 1, 2 and N that the normal double ring was broken in this one place.

While the invention has been described with reference to details of the illustrated embodiments, these details are not intended to limit the scope of the invention as defined in the appended claims.

What is claimed and desired to be secured by Letters Patent of the United States is:

1. An optical fiber ring communications system including multiple ports comprising:

first and second optical link modules (OLMs) coupled to each of said multiple ports;

first and second optical fibers extending between adjacent ports in the ring communications system and coupled at each end to one of said first and second OLMs;

said first and second optical fibers separately defining dual fiber channel arbitrated loops; and wherein said optical fiber ring communications system includes a ruler port and multiple subject ports and wherein the each said OLM further includes means for detecting an open optical fiber and each port includes means responsive to a detected open optical fiber for sending a predetermined message to configure said system as a different pair of separate smaller fiber channel arbitrated loops, each of said pair of separate smaller fiber channel arbitrated loops including said ruler port.

2. An optical fiber ring communications system as recited in claim 1 wherein each said OLM further includes means for generating handshake signals with an OLM of an adjacent port.

3. An optical fiber ring communications system as recited in claim 1 wherein each said OLM further includes means for detecting an open optical fiber and each port includes means responsive to a detected open optical fiber for sending a predetermined message to configure said system as a single fiber channel arbitrated loop.

4. An optical fiber ring communications system as recited in claim 3 wherein each said OLM further includes means for detecting a restored optical fiber and each port includes means responsive to a detected restored optical fiber for sending a predetermined message to configure said system as said dual fiber channel arbitrated loops.

5. An optical fiber ring communications system as recited in claim 1 wherein said first and second optical link modules (OLMs) are connected to a port path selection block of each of said multiple ports.

6. An optical fiber ring communications system as recited in claim 1 wherein each said OLM further includes means for detecting a restored optical fiber and each port includes means responsive to a detected restored optical fiber for sending a predetermined message to configure said system as said dual fiber channel arbitrated loops.

7. An optical fiber ring communications system as recited in claim 1 wherein said first and second optical fibers extending between adjacent ports in the ring communications system have a length of less than or equal to a transmission capability of said OLM.

8. An optical fiber ring communications system as recited in claim 1 wherein multiple N ports are connected in the ring communications system and N is an integer greater than three.

9. A method of communicating between multiple ports connected in a ring utilizing dual optical link modules (OLMs) with each of said multiple ports and a pair of optical fibers connected between adjacent ports, the multiple ports including a ruler port and multiple subject ports, said method comprising the steps of:

sending signals and data between said multiple ports using first and second arbitrated loops; and receiving a link disabled signal from an OLM and sending a predetermined signal to said multiple ports for communicating using a pair of separate smaller fiber channel arbitrated loops, each of said pair of separate smaller fiber channel arbitrated loops including said ruler port.

10. A method as recited in claim 9 further includes the steps of:

receiving a link restored signal from said OLM and sending a predetermined signal for communicating using said first and second arbitrated loops.

\* \* \* \* \*